US011656187B2

(12) United States Patent
Donzier et al.

(10) Patent No.: US 11,656,187 B2
(45) Date of Patent: May 23, 2023

(54) MICROWAVE DOPPLER FLOWMETER FOR HYDROCARBON WELLS

(71) Applicant: OPENFIELD, Versailles (FR)

(72) Inventors: Eric Donzier, Bercheres sur Vesgre (FR); Linda Abbassi, Katy, TX (US); Emmanuel Tavernier, Paris (FR)

(73) Assignee: OPENFIELD, Versailles (FR)

( * ) Notice: Subject to any disclaimer, the term of this patent is extended or adjusted under 35 U.S.C. 154(b) by 228 days.

(21) Appl. No.: 17/127,725

(22) Filed: Dec. 18, 2020

(65) Prior Publication Data

US 2021/0190558 A1 Jun. 24, 2021

(30) Foreign Application Priority Data

Dec. 19, 2019 (FR) .................................. FR1914973

(51) Int. Cl.
*G01N 22/00* (2006.01)
*G01F 1/663* (2022.01)
*G01F 1/74* (2006.01)

(52) U.S. Cl.
CPC ............ *G01N 22/00* (2013.01); *G01F 1/663* (2013.01); *G01F 1/74* (2013.01)

(58) Field of Classification Search
None
See application file for complete search history.

(56) References Cited

U.S. PATENT DOCUMENTS

| 3,932,737 A * | 1/1976 | Delepine ................. G01R 23/16 324/76.62 |
| 4,452,077 A | 6/1984 | Siegfried, II |
| 5,793,216 A | 8/1998 | Constant |

(Continued)

FOREIGN PATENT DOCUMENTS

| EP | 2587227 A1 | 5/2013 |
| FR | 2722292 A1 | 1/1996 |
| GB | 2251526 A | 7/1992 |

OTHER PUBLICATIONS

FR1914973, Preliminary Search Report, dated Sep. 3, 2020, France.

*Primary Examiner* — Harshad R Patel
(74) *Attorney, Agent, or Firm* — The Jansson Firm; Pehr B. Jansson

(57) ABSTRACT

A flowmeter measures a fluid velocity and/or direction of a moving multiphase fluid within a hydrocarbon well. The flowmeter includes a microwave front end module comprising transmit and receive antennas and a microwave circuit. The transmit antenna transmits electromagnetic signals towards the fluid at a high frequency ranging from 10 to 100 GHz. The flowmeter includes an analog electronics module converting an analog doppler signal successively into an amplified analog doppler signal and a digital doppler signal. The flowmeter includes a digital processing module comprising a Fast Fourier Transform algorithm for processing the digital doppler signal into a Doppler frequency spectrum. The Doppler spectrum contains information indicative of the fluid velocity and/or direction. A protective shell protects the modules from multiphase fluid. The protective shell comprises a first part positioned over the antennas and being transparent to electromagnetic signals, and a second part being opaque to electromagnetic signals.

33 Claims, 13 Drawing Sheets

(56) References Cited

U.S. PATENT DOCUMENTS

| | | | | |
|---|---|---|---|---|
| 6,049,762 A * | 4/2000 | Ganz | ............... | G01J 3/453 |
| | | | | 356/325 |
| 6,606,571 B2 * | 8/2003 | Phelan | ............... | G01S 13/50 |
| | | | | 239/69 |
| 2009/0107252 A1 | 4/2009 | Okazaki | | |
| 2016/0146743 A1 | 5/2016 | Edward | | |
| 2017/0016316 A1 | 1/2017 | Donzier | | |
| 2017/0168188 A1 * | 6/2017 | Fanini | ............... | G01V 3/28 |

* cited by examiner

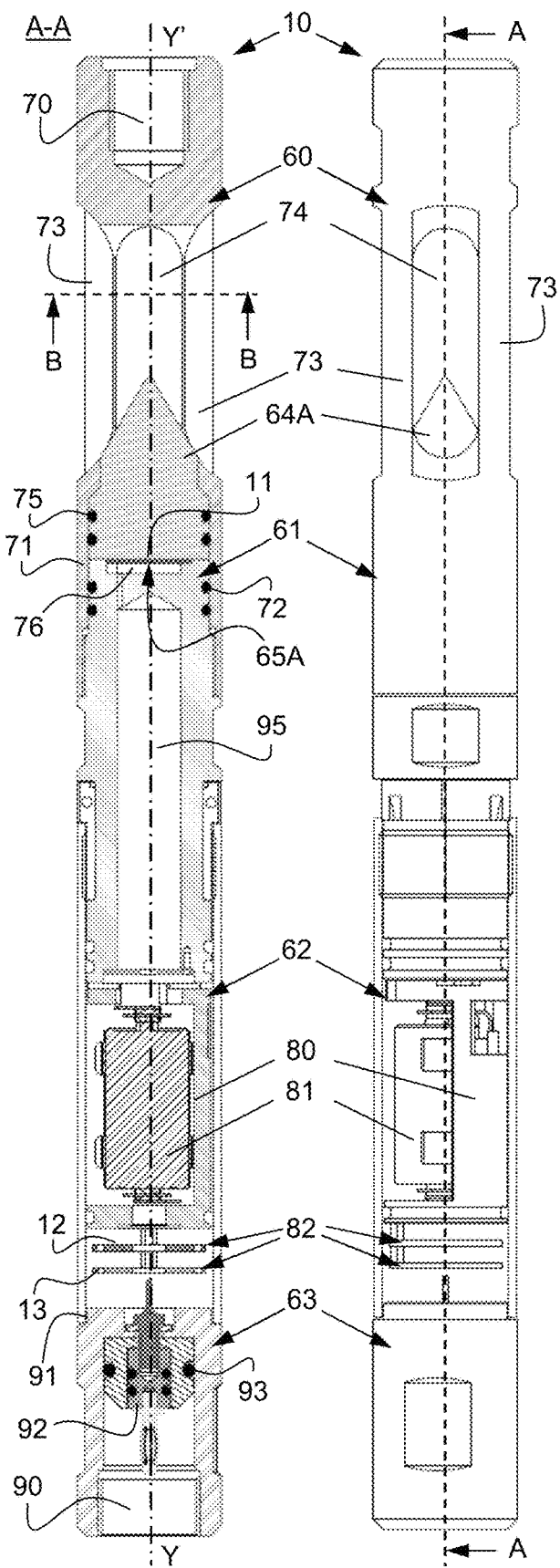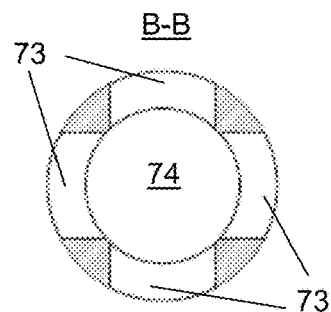
FIG. 10  FIG. 11  FIG. 12

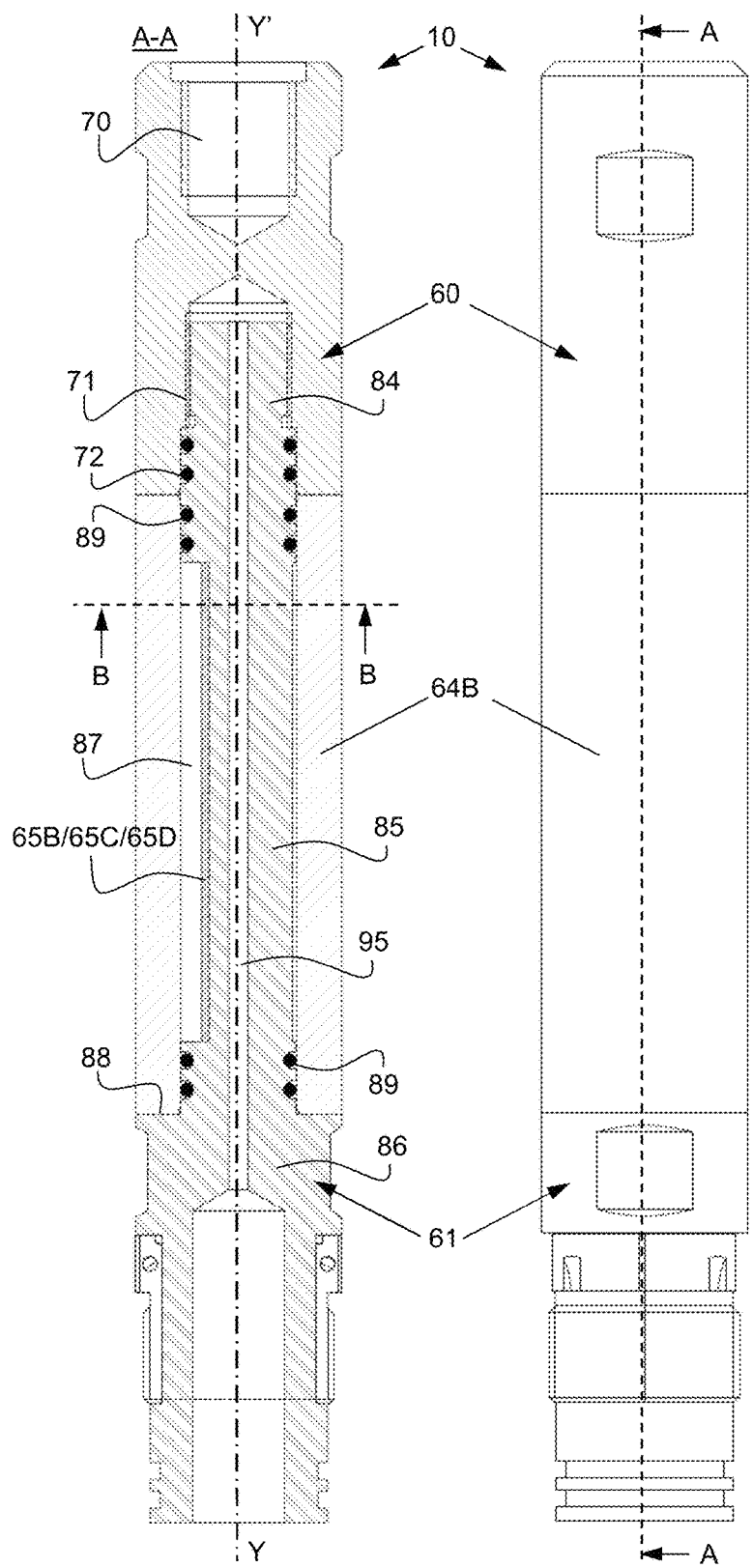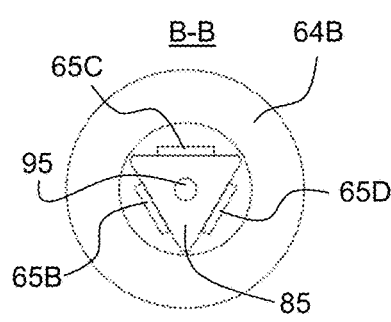
FIG. 14  FIG. 15  FIG. 16

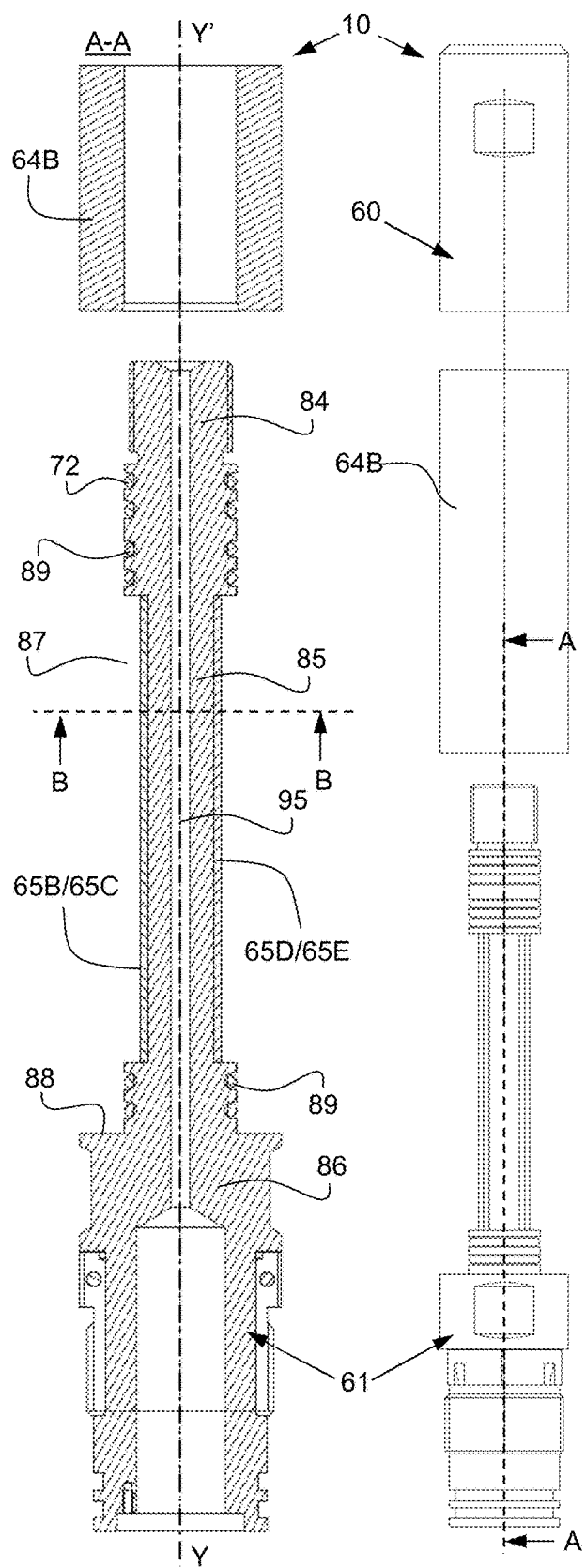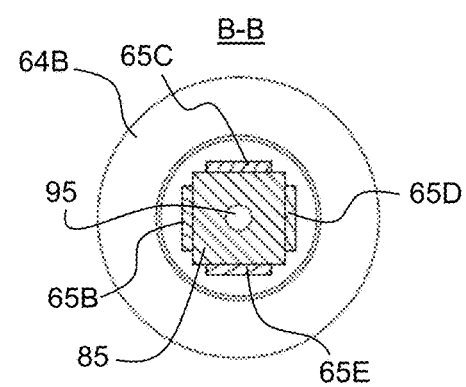
FIG. 17  FIG. 18  FIG. 19

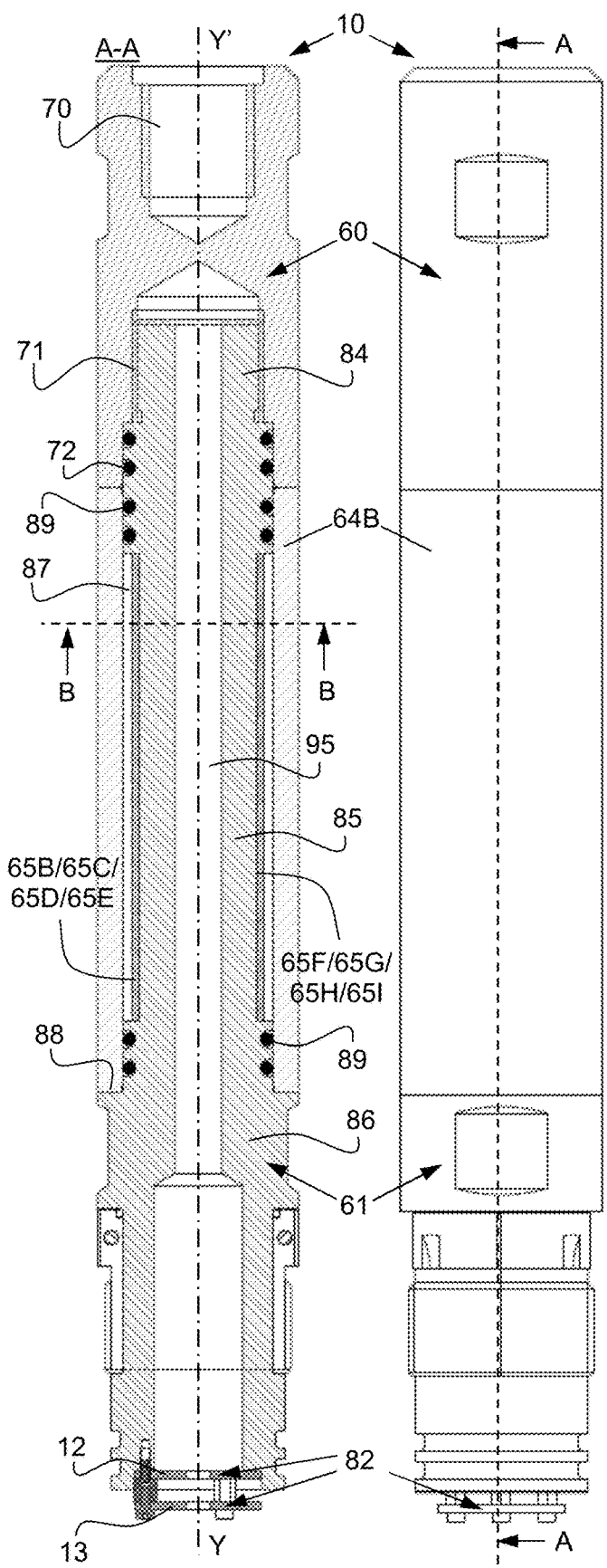
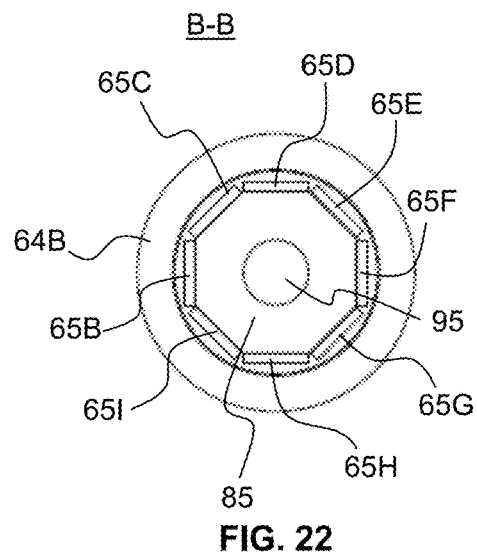
FIG. 20  FIG. 21  FIG. 22

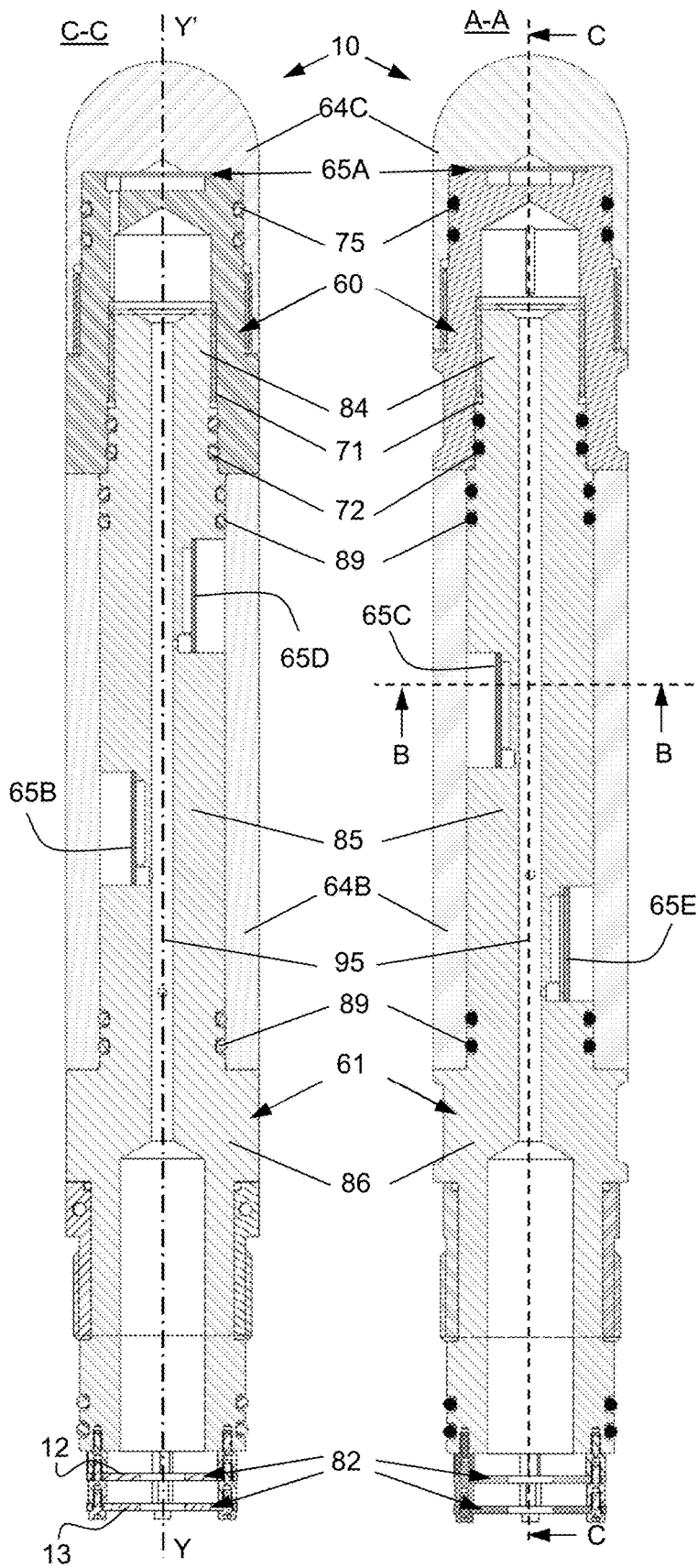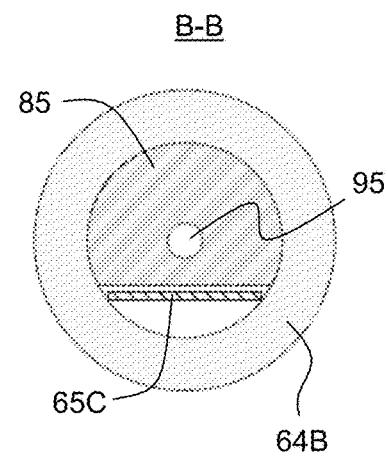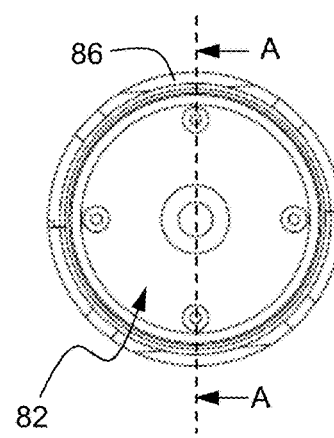
FIG. 27 FIG. 28 FIG. 29 FIG. 30

MICROWAVE DOPPLER FLOWMETER FOR HYDROCARBON WELLS

TECHNICAL FIELD

The invention relates to a downhole flowmeter intended for use within a hydrocarbon well. The invention is particularly applicable to the measurement of velocity and direction of flow in a hydrocarbon producing well, in particular to identify and determine a flow profile of the various phases (oil, gas and water). The invention is particularly applicable in harsh downhole environment including high temperature (up to 200° C.), high pressure (up to 2.000 bars) and corrosive fluid.

BACKGROUND

After the drilling, the evaluation, and the completion of a hydrocarbon well, production operations are implemented. During production, various parameters related to the drilled earth formations and the different phases (e.g. oil, gas and water) of multiphase fluid mixtures flowing into the borehole of the hydrocarbon well from the hydrocarbon bearing zones are measured and monitored. Various measurement logs (production logging) are performed in order to evaluate and optimize the production of the hydrocarbon well. As examples, these measurements may be related to the flow contributions of the different perforated zones, the identification of fluid types and properties, such as water, oil and gas relative proportions (holdups), etc. . . . . The measurement logs may be used to decide on corrective actions such as the shut-in of zones responsible for unwanted water or sand production, or the perforation of additional zones of interest for increasing oil and/or gas production, or the stimulation of zones that are producing below expectation.

Downhole tools are commonly deployed in the borehole of the hydrocarbon well for performing measurements and/or interventions. The downhole tools are run down inside the well-bore from the top of the hydrocarbon well, the wellhead, to the bottom of the hydrocarbon well. The downhole tools typically comprise various sensors acquiring data such as fluid pressure, fluid temperature, fluid density, fluid velocity, fluid conductivity along portions of the well-bore. The downhole tools are suspended by a line or cable which may also be used to communicate real time data to surface equipment. Current hydrocarbon wells often comprise a vertical well section, deviated well sections and horizontal well sections. In highly deviated or horizontal wells, the tool weight will not provide sufficient force to travel down, thus coiled tubing, rods or tractors are used to push the tools along the wellbore.

A known technique to evaluate flow is a flowmeter using single or multiple spinners. The relationship between spinner propeller rotation frequency (often referred as RPS, rotation per second) and flow speed is complex and depends on many factors including fluid density, fluid viscosity, propeller design, rotation axis damping, bearing, etc. . . . . A limitation of such a conventional solution is that it is not fully capable nor accurate enough to identify and determine a flow profile of various phases (oil, gas and water) in vertical, deviated or horizontal hydrocarbon wellbores along distances ranging from a few meters to a few kilometers.

Another known technique is a flowmeter using ultrasound. For example, the document WO2016145524 describes a device and method for imaging, measuring and identifying multiphase fluid flow in wellbores using phased array Doppler ultrasound. The device includes a radially configured or ring-shaped ultrasound transducer that when deployed in a well in Doppler mode can measure the velocity of radially flowing fluids in the wellbore and generate a 3D image of radial flow in the wellbore, including flowback into the wellbore after fracturing operations, or flow leaving the wellbore during water injection operations. The ring-shaped ultrasound transducer can also simultaneously operate in B-mode to generate a B-mode image of the wellbore liner upon which the Doppler image can be overlaid. The device may also include a forward-facing ultrasound transducer either instead of or in place of the ring-shaped transducer for obtaining information and images on axial flow in the wellbore in Doppler mode, and the location of phase boundaries and phase locations in B-mode. The main drawback of such a solution is that whilst it can measure flow of liquids it is not adapted to measure gaseous flow of gas nor mixtures of liquid and gas.

SUMMARY OF THE DISCLOSURE

The present invention seeks to provide a downhole flowmeter intended for use within a hydrocarbon well using microwave doppler principle (i.e. radar) that overcomes one or more of the limitations or drawbacks of the existing downhole flowmeter. Further, the present invention seeks to provide a downhole flowmeter that can measure radial flow within hydrocarbon wells.

According to one aspect, there is provided a flowmeter intended for use within a hydrocarbon well for measuring a fluid velocity and/or a fluid direction of a moving multiphase fluid present in the hydrocarbon well, including:

a microwave front end module comprising at least one transmit antenna and at least one receive antenna and a microwave circuit, the microwave circuit comprising an oscillator coupled to the transmit antenna for causing said antenna to transmit microwave signals towards the multiphase fluid at a high frequency ranging from 10 to 100 GHz, a mixer coupled to the receive antenna and to a filter for generating an analog in-phase doppler signal depending on microwave signals returned from moving multiphase fluid;

an analog electronics module comprising an amplifier and an analog-to-digital converter converting the analog doppler signal successively into an amplified analog doppler signal and a digital doppler signal;

a digital processing module comprising a Fast Fourier Transform algorithm for processing the digital doppler signal into a Doppler frequency spectrum and a filter providing a compressed Doppler frequency spectrum, said Doppler spectrum containing information indicative of the fluid velocity and/or the fluid direction of the moving multiphase fluid; and a protective shell protecting the microwave front end module, the analog electronics module and the digital processing module from multiphase fluid, the protective shell comprising a first part positioned over said antennas and being transparent to microwave signals, and a second part being opaque to microwave signals.

The transmit antenna and receive antenna may extend perpendicular to a longitudinal axis of the flowmeter at a front part of the flowmeter so as to form an axial microwave doppler sensor that is sensitive to the multiphase fluid having an axial velocity and flowing along a longitudinal axis of the hydrocarbon well.

The transmit antenna and receive antenna may extend parallel to a longitudinal axis of the flowmeter at a periphery of the flowmeter so as to form a radial microwave doppler sensor that is sensitive to the multiphase fluid having a radial velocity and corresponding to lateral entries into the hydrocarbon well.

The flowmeter may comprise three or more radially arranged microwave doppler sensors which are polygonally distributed (e.g. arranged in a triangular, square or octagonal orientation) in a plane perpendicular to the longitudinal axis of the flowmeter, respectively.

The transmit antenna and receive antenna may comprise phased array patch antennas.

The transmit antenna, the receive antenna and the microwave circuit may be integrated on a same printed circuit board PCB, said antennas and said microwave circuit being either on the same or opposite sides of said PCB.

The flowmeter may further comprise a quadrature mixer and a second filter so as to provide an analog quadrature doppler signal to determine a fluid direction of the moving multiphase fluid.

The digital processing module may be further coupled to a telemetry module operable to communicate with surface equipment or a memory used to record measurements downhole.

The filter may comprise a logarithmic filter.

The first part of protective shell may comprise a protection cap having a conical shape, or a protection cap having a half spherical shape, and/or a protection hollow cylinder extending longitudinally.

The first part may comprise a PolyEther Ether Ketone (PEEK) material. The second part may comprise stainless steel.

The flowmeter may comprise a microwave module part, a power and processing module part and a rear connection part coupled together in series, having a cylindrical shape and that extends along the longitudinal axis of the flowmeter, the microwave module part comprising at least one microwave front end module.

The power and processing module part may comprise a battery support cradle operable to receive an electrical storage battery, and at least one PCB including the analog electronics module and the digital processing module.

The rear connection part may comprise a first rear connector used to connect one side of the flowmeter with a subsection of a downhole tool, a second rear connector coupling the rear connection part to the power and processing module part, and an electrical coaxial connector connected to the PCB of the analog electronics and digital processing modules.

The flowmeter may further comprise a front connection part including a first front connector used to connect one side of the flowmeter with another subsection of a downhole tool, and a second front connector coupling the front connection part to the microwave module part.

According to another aspect, there is provided a downhole tool used to measure and analyze a fluid present in a hydrocarbon well, the tool being adapted for displacement along and within the hydrocarbon well and comprising a microwave doppler flowmeter in accordance with the invention.

According to a further aspect, there is provided a method for measuring radial and/or axial flow of a fluid mixture present in a hydrocarbon well according to multiple cross-sections of the hydrocarbon well the method comprising running a flowmeter according to the invention along a defined distance within the hydrocarbon well, transmitting microwave signals towards the multiphase fluid at a high frequency ranging from 10 to 100 GHz, receiving microwave signals returned from moving multiphase fluid, and processing said returned microwave signals such as to provide a flow profile image of the hydrocarbon well.

The microwave doppler flowmeter of the invention has the following advantages:

No in-situ calibration is necessary; the sensor response is modelled by well-known physics and is based on constants known to a high degree of accuracy such as speed of light;

It allows a direct and extremely accurate measurement of velocity of "flowing structures" travelling within the flow along the axis of the wellbore;

The flowmeter has no moving part achieving robust hardware;

Sensor and electronics with embedded software enables a robust extraction of velocity;

The microwave doppler sensor is of a small size and can be integrated in a small diameter flowmeter creating minimal flow perturbation, and owing to such small size, the tool may comprise a plurality of microwave doppler sensors angularly distributed around its longitudinal axis;

The flowmeter can therefore be arranged as a simple, compact, low cost and substantially maintenance free arrangement;

The flowmeter may be self-calibrating, leading to significant savings compared to spinner calibration time arising from a "shut-down condition";

It is possible to directly measure radial flow from perforations (cased hole) or fractures clusters (open hole, slotted liners or sand screens); and The flowmeter is capable of operating under extreme pressure conditions ranging from a few hundred bars to more than 2000 bars and is capable of measuring velocity and direction of flow within a hydrocarbon producing well, namely velocity and direction of flow of fluid within a well, directed towards a hydrocarbon reservoir.

Other advantages will become apparent from the hereinafter description of the invention.

BRIEF DESCRIPTION OF THE DRAWINGS

The present invention is illustrated by way of examples and not limited to the accompanying drawings, in which like references indicate similar elements:

FIGS. 10-13 are, respectively, a A-A cross-sectional view, a partially transparent side view, a B-B cross-sectional view, and a perspective view of a first embodiment of the microwave doppler flowmeter of the invention comprising a single axial microwave doppler sensor;

FIGS. 14-16 are, respectively, a A-A cross-sectional view, a side view and a B-B cross-sectional view of a second embodiment of a microwave module of the microwave doppler flowmeter of the invention comprising three radial microwave doppler sensors;

FIGS. 17-19 are, respectively, a A-A cross-sectional view, a partially exploded side view and a B-B cross-sectional view of a third embodiment of a microwave module of the microwave doppler flowmeter of the invention comprising four radial microwave doppler sensors;

FIGS. 20-22 and 25 are, respectively, a A-A cross-sectional view, a side view, a B-B cross-sectional view and a partially exploded perspective view of a fourth embodiment of a microwave module of the microwave doppler flowmeter of the invention comprising eight radial microwave doppler sensors;

FIGS. 27-30 are, respectively, a C-C cross-sectional view, a A-A cross-sectional view, a bottom view and a B-B cross-sectional view of a fifth embodiment of a microwave module of the microwave doppler flowmeter of the invention comprising one axial and four radial microwave doppler sensors.

DETAILED DESCRIPTION

The invention will be understood from the following description, in which reference is made to the accompanying drawings.

Figure 1:
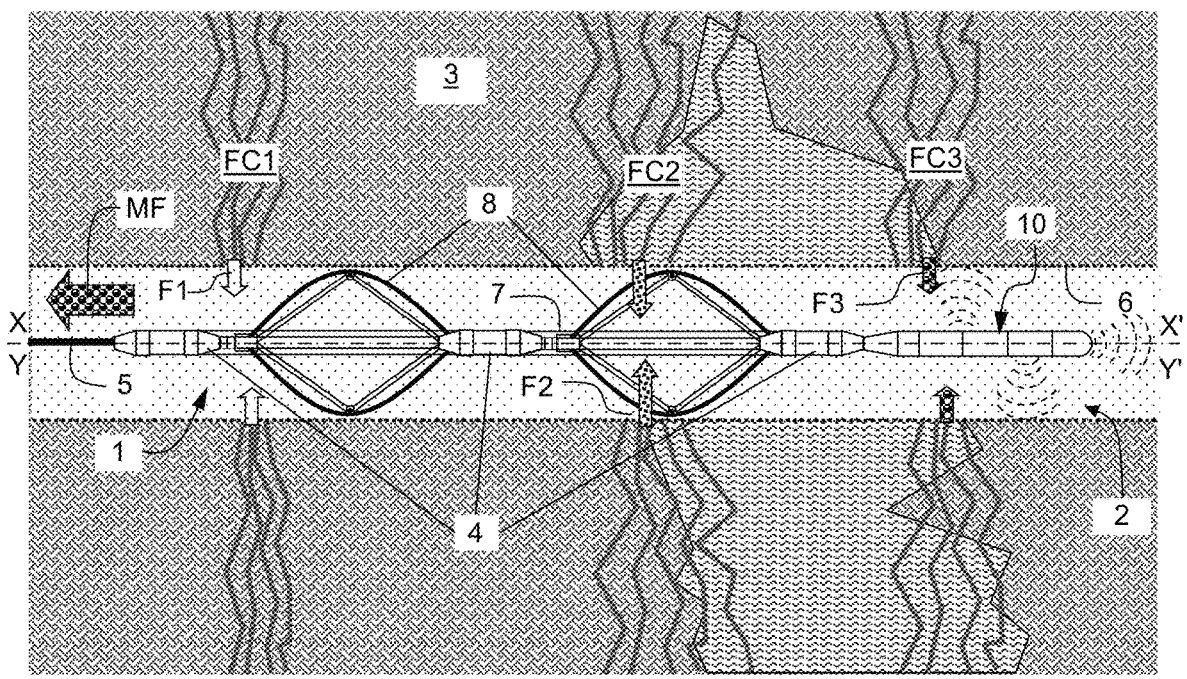
FIG. 1 is a cross-sectional view illustrating a downhole tool of the invention being deployed in a horizontal section of a hydrocarbon well.

FIG. 1 illustrates a downhole tool, for example a production logging tool 1 being deployed into a wellbore of a hydrocarbon well 2 that has been drilled into a subterranean formation 3. In this particular example, the downhole tool is deployed in a horizontal section of a hydrocarbon well that has been further fractured at defined locations (i.e. fracture clusters FC1, FC2, FC3). The production logging tool 1 is used to analyze at least one property of a multiphase flow mixture MF flowing in the hydrocarbon well 2. The multiphase flow mixture MF is characterized by holdup, slippage velocity and phase segregation. Holdup is the percentage by volume of the gas, oil and/or water content in the wellbore measured over a cross-sectional area (based on the wellbore inner diameter). Slippage velocity is the relative velocity existing between light phases and heavy phase (light phases move faster than heavier phases). Phase segregation is the tendency of fluids to stratify into different layers because of differences in density between oil, water and gas and due to the immiscibility of water and oil, and the limited miscibility (depending on temperature and pressure) of gas in oil and water. The wellbore refers to the drilled hole or borehole, including the open hole or uncased portion of the well. The borehole refers to the inside diameter of the wellbore wall, the rock face that bounds the drilled hole. The open hole refers to the uncased portion of a well. While most completions are cased, some are open, especially in horizontal wells where it may not be possible to cement casings efficiently. The production logging tool 1 is suitable to be deployed and run in the wellbore of the hydrocarbon well 2 for performing various analysis of the multiphase flow mixture MF properties irrespective of a cased or uncased nature of the hydrocarbon well. The production logging tool 1 may comprise various subsections 4 having different functionalities and may be coupled to surface equipment through a wireline 5 (or alternative equipment such as coiled tubing) which is operable at a surface equipment to displace the tool along the well. At least one subsection 4 comprises a measuring device generating measurements logs, namely measurements versus depth or time, or both, of one or more physical quantities in or around the well 2. Wireline logs are taken downhole, transmitted through the wireline 5 to surface and recorded there, or else recorded downhole and retrieved later when a logging instrument is brought to surface. There are numerous log measurements (e.g. electrical properties including conductivity at various frequencies, sonic properties, active and passive nuclear measurements, dimensional measurements of the wellbore, formation fluid sampling, formation pressure measurement, etc. . . . ) possible while the production logging tool 1 is displaced along and within the hydrocarbon well 2 drilled into the subterranean formation 3. Ancillary surface equipment is neither shown nor described in detail herein. In the following the wall of the wellbore irrespective of its cased (cement or pipe) or uncased nature is referred to wall 6. Various fluid (that may include solid particles) entries F1, F2, F3 may occur from the subterranean formation 3 towards the wellbore 2. Once in the wellbore 2, these fluid entries form the multiphase flow mixture MF that generally flows towards the surface. In particular, in deviated or horizontal wells, the multiphase fluid mixture MF may be segregated. In a particular example, the segregated multiphase flow mixture MF may flow as a layer of gas above a layer of oil, further above a layer of immiscible oil and water mixture from top to bottom (i.e. in the direction of earth gravity).

The production logging tool 1 has an elongated cylindrical body shape and comprises a central pressure-resistant rigid housing 7 carrying at least one centralizer arrangement 8. The production logging tool 1 extends longitudinally about the longitudinal axis YY'. The centralizer arrangement 8 substantially centers the production logging tool 1 with respect to the wellbore axis XX' during operations in the wellbore. In this way, the longitudinal axis YY' of the production logging tool 1 and the wellbore axis XX' are substantially parallel, generally co-axial. Further, when the production logging tool 1 is moved along the wellbore, the centralizer arrangement 8 is adapted to fit through borehole sections of different diameter while offering a minimal frictional resistance.

The downhole tool 1 further comprises a microwave doppler (i.e. radar) flowmeter 10 of the invention so as to determine the individual production contribution from the fracture clusters FC1, FC2, FC3, and also the global flow in the wellbore. In particular, the microwave doppler flowmeter 10 is used to measure both radial flow F1, F2, F3 and longitudinal/axial flow MF in the wellbore.

The microwave doppler flowmeter 10 of the invention is based on an electromagnetic EM/microwave technology (radar). The microwave doppler flowmeter operates in the range of 10 to 100 GHz. The microwave doppler flowmeter can operate in oil and gas producing wells under extreme conditions (high temperature up to 200° C., high pressure up to 2.000 bars and corrosive fluid). Such extreme conditions yield a number of challenges in terms of robustness, accuracy, self-calibration, small dimensions compatible with well inner diameter that have not been addressed until now.

The basic operation of the microwave doppler flowmeter is based on a dual antenna structure composed of a transmit antenna fed by a radio frequency oscillator and a receive antenna. Signals generated by the receive antenna are mixed in the mixer in order to produce a low frequency doppler signal which is then amplified, digitalized and processed.

Figure 2:
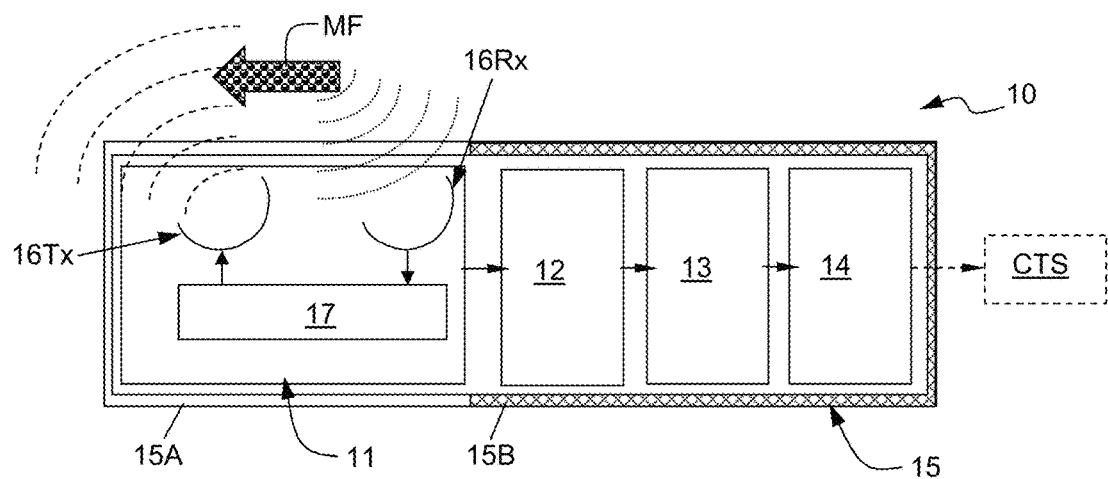
FIGS. 2-6 are schematic and simplified views illustrating an exemplary embodiment of the microwave doppler flowmeter of the invention, associated electronics and operation principles.

FIG. 2 is a simplified schematic view of the microwave doppler flowmeter 10 in an exemplary embodiment. The microwave doppler flowmeter 10 comprises a microwave front end module 11, an analog electronics module 12, a digital processing module 13, a telemetry module 14 and a protective shell 15. The microwave front end module 11 is coupled to the analog electronics module 12 that is further coupled to the digital processing module 13. The digital processing module 13 is coupled to the telemetry module 14. The microwave front end module 11 comprises transmit and receive antennas 16Tx, 16Rx coupled to a microwave circuit 17. The telemetry module 14 is used to communicate CTS with surface equipment. The telemetry module 14 is optional and may be replaced by a memory when all measurements are recorded downhole. The protective shell 15 protects the microwave front end module 11, the analog electronics module 12, the digital processing module 13 and the telemetry module 14 from the external environment encountered in the hydrocarbon well. The protective shell 15 comprises a first part 15A that is transparent to microwave, and a second part 15B that is opaque to microwave.

Figure 3:
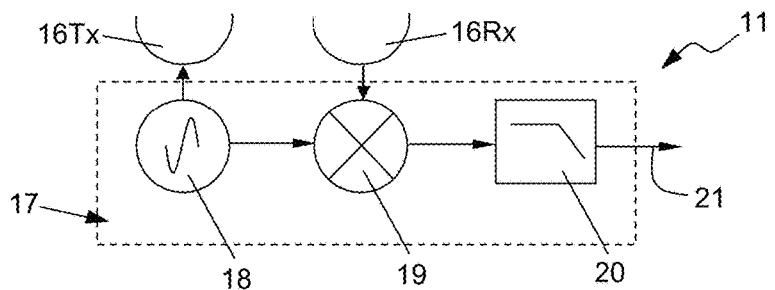
Figure 4:
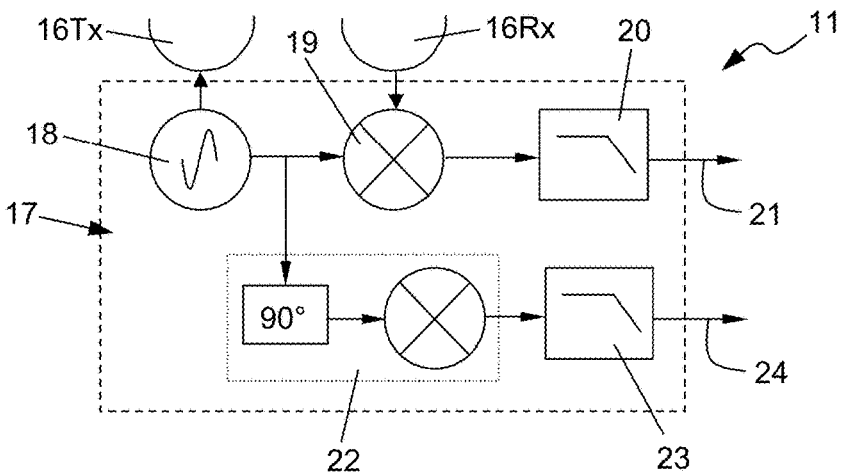

Microwave Front End:

FIGS. 3 and 4 are simplified schematic views of two alternate microwave front end modules 11. FIG. 4 differs from FIG. 3 in that the microwave front end modules 11 further comprises a mixer that is a quadrature mixer. A quadrature mixer enables determining the flow direction. This is advantageous as recirculation can occur in deviated wellbores where non-miscible phases can flow (e.g. oil and water). In an ideal context where a laminar flow occurs, the signal at the output of the mixer is sinusoidal and the doppler spectrum is a single peak. In actual well conditions, the doppler spectrum can be much more complex and typically requires specific filtering in order to be able to extract flow velocity value. Indeed, beyond the flow itself, several effects induce a doppler shift on signals, namely:

During logging, reflections from the wellbore wall may induce a doppler signal which is related to the flowmeter being run (at a logging speed) in the wellbore uphole (towards the surface) or downhole (towards the bottom of the well). This means that, in order to discriminate the flow signal from the flowmeter speed signal, the logging speed must be inferior to the expected fluid velocities to be measured. This is an acceptable condition for most operations as typical logging speeds are from 0.1 to 0.3 m/s and velocity from fluid flow ranges from 0.5 to 10 m/s. For very low velocity measurements the flowmeter must be deployed in stationary mode.

The spectrum extracted from the received microwave comes from contributions from a multitude of bubbles reflectors which have different velocities. The Doppler spectrum comprises multiple peaks. Indeed, in many flow conditions the flow is turbulent and vortices are present in the wellbore. In contradistinction, in a laminar flow, all the bubbles have substantially the same speed, and a Doppler spectrum comprises a single peak.

The microwave front end module 11 comprises transmit and receive antennas 16Tx, 16Rx coupled to the microwave circuit 17. The microwave circuit 17 comprises an oscillator 18, a mixer 19 and a filter 20. The microwave circuit 17 of FIG. 3 provides an analog in-phase doppler signal 21. The microwave circuit 17 of FIG. 4 further comprises a quadrature mixer 22 and a second filter 23. The microwave circuit 17 of FIG. 4 provides an analog in-phase doppler signal 21 and an analog quadrature doppler signal 24.

The microwave circuit may comprise High Electron Mobility Transistors (HEMT) based on III-V semiconductor heterostructures. Such a technology achieves low noise values and high gain up to frequencies above 50 GHz that is well adapted to microwave oscillator designs. The antennas 16Tx, 16Rx will be described in detail hereinafter in relation with FIGS. 7 to 9.

Figure 5:
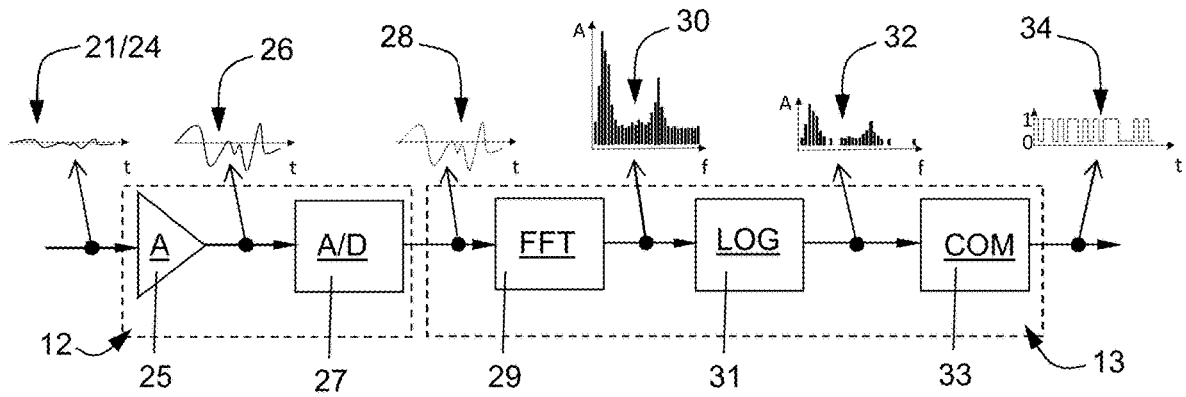

Signal and Data Processing:

FIG. 5 is a simplified schematic view of the data processing chain, namely the operation of the analog electronics module 12 and the digital processing module 13. The analog electronics module 12 comprises an amplifier (A) 25 and an analog-to-digital converter (N/D) 27. It converts the analog in-phase doppler signal 21 (resp. the analog quadrature doppler signal 24) into an amplified analog doppler signal 26 and then a digital doppler signal 28.

The digital processing module 13 is a processing arrangement that includes a microcontroller with assembler coded embedded firmware. Data management during production logging operation must be handled carefully due to data size limitations. Measurements may be either recorded in the flowmeter itself for subsequent analysis (i.e. post job) or transmitted in real time to surface equipment. Though, in both cases, the amount of data that can be acquired by the flowmeter is limited. In situ downhole computation is thus required as recording or transmission of the full doppler signal waveform for further processing is not possible. The processing arrangement aims at implementing an efficient data treatment and data compression. As an example, the digital processing module 13 comprises a Fast Fourier Transform (FFT) 29, a logarithmic filter (LOG) 31 and a communication module (COM) 33.

Firstly, a Fast Fourier Transform (FFT) algorithm is performed downhole onto the full digital doppler signal 28. The Fast Fourier Transform 29 provides a Doppler spectrum 30.

Secondly, a downhole data processing algorithm is performed downhole onto the Doppler spectrum 30. This algorithm takes into account the fact that the signal amplitude can vary in high proportion depending on the flow conditions. As an example, a water slug moving towards the antenna in a gas filled wellbore will produce large echoes compared to another situation where small oil bubbles are moving in a brine filled wellbore (i.e. the water continuous medium is highly attenuating the microwave beam). An appropriate data processing algorithm enables operating the flowmeter in all, at least in most, cases of flow conditions. The downhole data processing algorithm may be based on a logarithmic filter 31. Such a filter enables covering all, at least most, ranges of flow conditions with sufficient resolution while optimizing said data size. The logarithmic filter 31 provides a compressed Doppler spectrum 32.

Thirdly, the compressed Doppler spectrum 32 is further processed by the communication module 33 as data signal 34 to be either transmitted to surface via the telemetry module 14 (transmitted data) or recorded in memory (not shown) downhole (recorded data).

Figure 6:
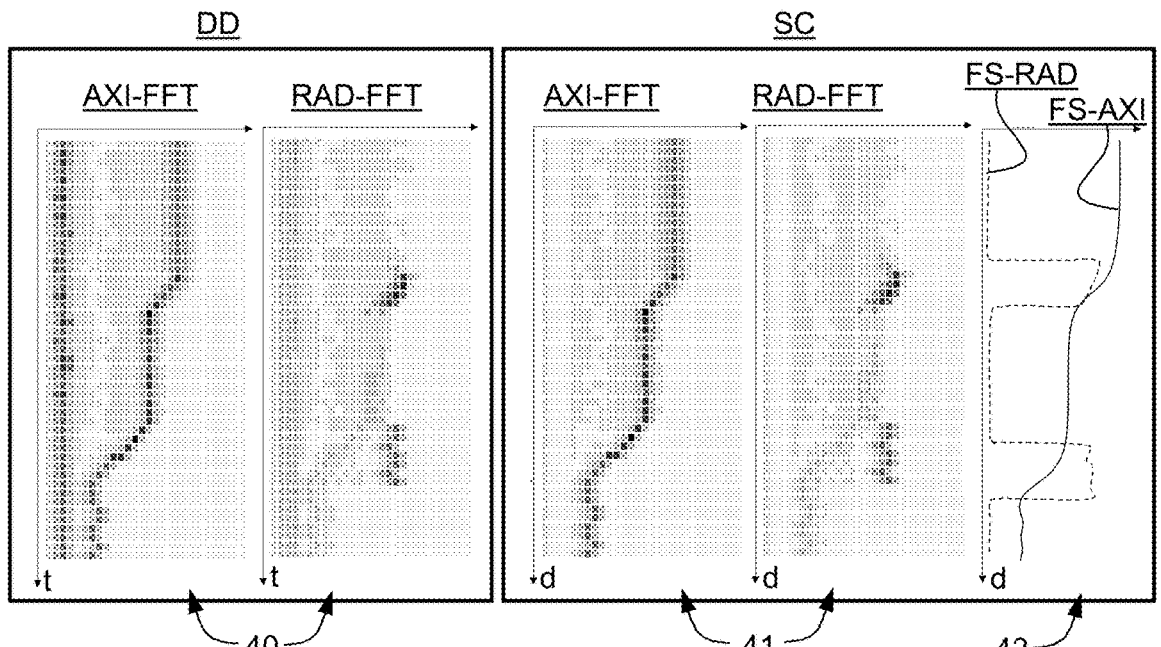

The processed spectra (data signal 34) resulting from the hereinbefore process may be analyzed using a computation algorithm running on a computer at the surface. FIG. 6 illustrates compressed Doppler spectrum 32 as downhole data (DD) 40 (function of time, t), processed Doppler spectrum 41 after surface computation (SC) and flow speed FS-RAD and FS-AXI calculation 42 (function of depth, d) after surface computation (SC) based on radial RAD and axial AXI measurements. Spectral analysis is either performed in real time on the transmitted data or as a post processing step on the recorded data. This algorithm filters the line speed signal (namely the velocity of the tool supporting the flowmeter imposed by the line or coil tubing)

and amplitude fronts detection (namely the velocity of flow speed relative to the tool supporting the flowmeter). It allows extraction of the flow speed signal from other signals such as those generated by echoes from the borehole wall and turbulences effects.

The doppler theory gives the equation which governs the reflected microwave frequency shift from target echoes moving towards the antenna:

$$Fd = 2 \cdot Ft \cdot (v/c) \cdot \cos\theta \qquad (1)$$

with:
Fd: doppler frequency (Hz);
Ft: microwave transmitting or operating frequency (typically >10 GHz);
v: velocity of structures moving in the wellbore along its axis (m/s);
c: light speed in medium (around $3.10^8$ m/s);
θ: angle between flow velocity vector and transmitted microwave beam (This angle is known, either the fluid is flowing towards the antenna and angle θ is nil, or the antenna is a phased array antenna or an inclined antenna and angle θ is defined by the corresponding antenna configuration with respect to the flow direction).

The microwave doppler flowmeter may operate in a continuous way, i.e. microwave beams are transmitted and received continuously. In one configuration, the microwave doppler flowmeter comprises two distinct transmit and receive antennas 16Tx, 16 Rx. A first antenna is the transmit antenna 16Tx that is excited by an transmit signal provided by the oscillator 18 such as to radiate a microwave. A second antenna is the receive antenna 16Rx that detects electromagnetic waves returned from moving targets whereby to generate a receive signal. Both transmit and receive signals are mixed with the mixer 19 (or 19 and 22) in order to extract the doppler signal 21 (or 21 and 24) at low frequency.

For a 30 GHz operating frequency it gives a doppler shift of 200 Hz/(m/s). As an example, it means that water droplets traveling at 10 m/s in a gas stream flowing towards the flowmeter will give a doppler frequency of 2 KHz. Amplitude of signal depends on the number and size of water droplets, information which can also be useful to understand well characteristics, such as water entries in a gas producing well.

There are several advantages in operating at high frequencies, namely in range from 10 to 100 GHz. Firstly, targets having small dimensions (ranging from 3 mm to 3 cm) can be detected because the microwave energy reflected from such targets is dependent on its relative size to the wavelength of the microwave. Secondly, measuring low flow velocity at high logging speed (for operation efficiency) requires to minimize acquisition time for Fast Fourier Transform FFT computation and therefore to operate at higher minimum doppler frequency (resolving low frequency signal requires an acquisition times equal to the period of the signal). Following the doppler equation (1) for a fixed velocity, the doppler frequency is proportional to the transmission frequency.

Figure 7:
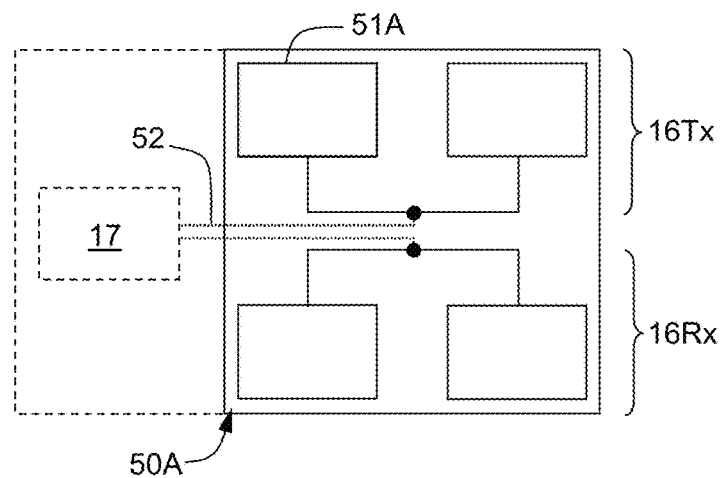
FIGS. 7-9 are schematic views illustrating various antenna embodiments of the microwave doppler flowmeter of the invention.
Figure 8:
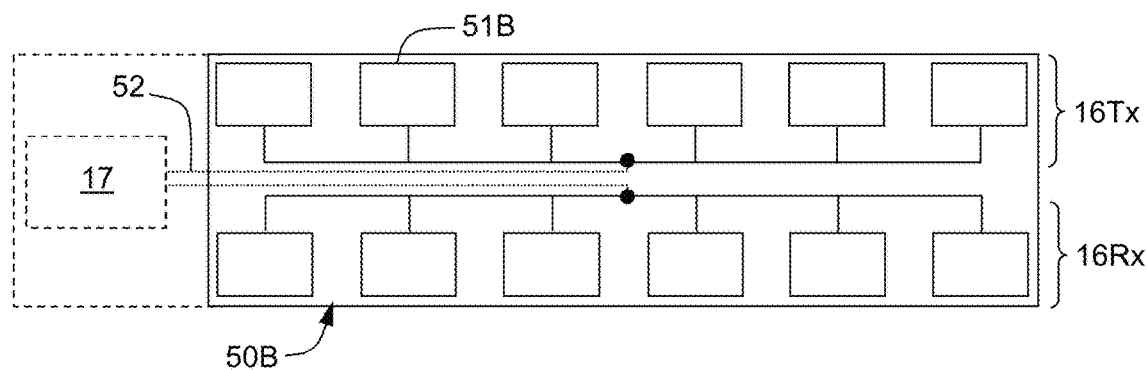
Figure 9:
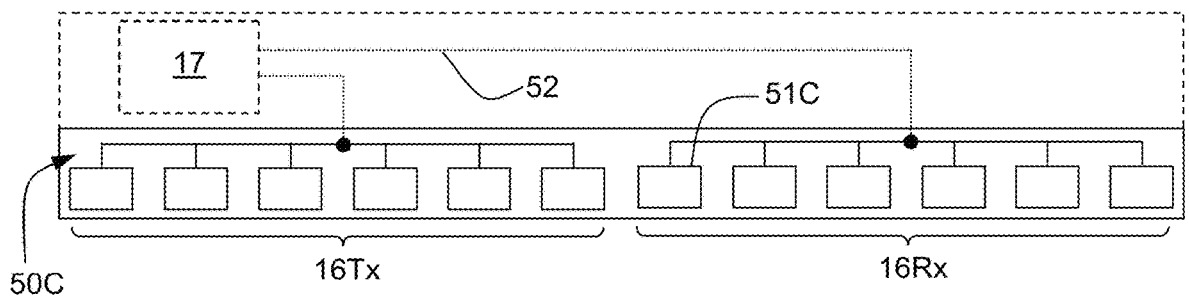

Antenna:

Various embodiments of antenna 16Tx, 16Rx are illustrated as top view in FIGS. 7-9 as simplified layout. A patch antenna is simple to manufacture using Printed Circuit Board (PCB) technology. Each antenna, being either a transmit antenna 16Tx or a receive antenna 16Rx, is manufactured according to a microstrip patch design on a PCB 50A, 50B, 50C. It is made of rectangular conductive structures 51A, 51B, 51C separated from a ground plane by a thin layer of dielectric material. Alternatively, the microwave circuit, more precisely the microwave front end circuitry 17 can be integrated on the same PCB (broken line extension) or on the back (not shown) of the same PCB using metal micro via 52. Thus, the need for connectors is reduced and the whole assembly including patch antenna and associated microwave circuit can be assembled into a package of small dimensions. Typically, dimensions of 25×25×3 mm can be achieved for a complete "24 GHz front end" including antenna and circuit.

By multiplying the number of transmit antennas and receive antennas on the same PCB, the microwave beam can be steered.

FIG. 7 illustrates a patch antenna 50A in a configuration where two transmit antennas 16Tx are parallel to two receive antennas 16Rx.

FIG. 8 illustrates a phased array patch antenna 50B for angled beam transmission in a configuration where eight transmit antennas 16Tx and eight receive antennas 16Rx are in parallel spaced apart formation.

FIG. 9 illustrates a phased array patch antenna 50C for angled beam transmission in a configuration where eight transmit antennas 16Tx are in series with eight receive antennas 16Rx. Such a configuration enables achieving minimal PCB width.

The microwave beam can be steered in controlled fashion using such phased array patch antennas. Such an antenna design is advantageous because the velocity profiles are measured around a flowmeter included in a tubular/cylindrical tool structure as will be explained hereinafter. Multiple antennas may be positioned around the periphery of the flowmeter, each antenna being sensitive to an angular section of the wellbore. This is advantageous in deviated wells where segregations occur. It enables measuring a flow profile around the flowmeter. Further, the implementation of PCB having a low width enables integrating a large number of antennas in the flowmeter.

FIGS. 10-34 show various embodiments of the microwave doppler flowmeter 10. The microwave doppler flowmeter 10 comprises a front connection part 60, a microwave module part 61, a power and processing module part 62 and a rear connection part 63. In particular, FIGS. 10, 11, 13, 23, 24 and 26 show a complete microwave doppler flowmeter 10 while the other FIGS. only show the front connection part 60 and the microwave module part 61 of the microwave doppler flowmeter 10 embodiments. The front connection part 60, the microwave module part 61, the power and processing module part 62 and the rear connection part 63 are coupled together in series and have a general cylindrical shape and extend longitudinally along the longitudinal axis YY'.

The front connection part 60 comprises a first front connector 70 at a distal end. Such a first front connector 70 may be a threaded connector used to connect one side of the microwave doppler flowmeter with other sub section 4 of the downhole production tool 1 (visible in FIG. 1). The front connection part 60 further comprises a second front connector 71 that couples the front connection part 60 to the microwave module part 61. Such a second front connector 71 may be a threaded connector and further includes a sealing 72, for example at least one O-ring, advantageously multiple O-rings.

The microwave module part 61 comprises at least one microwave front end module 11, each microwave front end module 11 comprising transmit and receive antennas 16Tx, 16Rx (not visible except on FIG. 25) and the microwave circuit 17 (not visible on FIGS. 10-34). The microwave front end module 11 is covered by a protective shell 64 ensuring a protection with respect to external fluids (high pressure, high temperature and corrosive). The protective shell 64 allows transmission of the microwave beam in both directions, namely transmit microwave from the antenna towards the fluid, and reflected microwave from the liquid towards the antenna. The protective shell 64 may be made of high strength polymer material such as PolyEther Ether Ketone (PEEK—an organic thermoplastic polymer in the polyaryletherketone family) or a ceramic material. The protective shell 64 may take various shape, for example a protection cap 64A having a conical shape as seen in FIGS. 10 and 11 (first embodiment), or a protection hollow cylinder 64B extending longitudinally as seen in FIGS. 14-16 (second embodiment), FIGS. 17-19 (third embodiment), FIGS. 20-22 (third embodiment), FIGS. 23-25 (fourth embodiment), or a combination of a protection hollow cylinder 64B extending longitudinally and a protection cap 64C having a half spherical shape as seen in FIGS. 27-32 (fifth embodiment).

The power and processing module part 62 comprises a battery support cradle 80 receiving an electrical storage battery 81, and at least one PCB 82 including the analog electronics module 12 and the digital processing module 13. The PCB 82 of the analog electronics and digital processing modules may be positioned between the power and processing module part 62 and the rear connection part 63 (as depicted in FIGS. 20, 21, 23, 27, 28 and 31), or between the power and processing module part 62 and the microwave module part 61 (as depicted in FIGS. 10 and 11). The power and processing module part 62 further comprises a protective casing 83 (only visible in FIGS. 23, 24 and 26) that is sealed against the microwave module part 61 and the rear connection part 63 by means of appropriate sealing, for example O-rings (not shown).

The rear connection part 63 comprises a first rear connector 90 at a distal end. Such a first rear connector 90 may be a threaded connector used to connect one side of the microwave doppler flowmeter with other sub section 4 of the downhole production tool 1 (visible in FIG. 1). The rear connection part 63 further comprises a second rear connector 91 that couples the rear connection part 60 to the power and processing module part 62. Such a second rear connector 71 may be a threaded connector. The rear connection part 63 further includes an electrical coaxial connector 92 that is sealed against the internal wall of the first rear connector 90 by means of a sealing 93, for example an O-ring. The electrical coaxial connector 92 is connected to the PCB 82 of the analog electronics and digital processing modules.

A hollow passageway 95, for example positioned along the longitudinal axis YY' is provided for driving electric wire from the various PCBs (from and towards the microwave module part and the power and processing module part).

Figure 13:
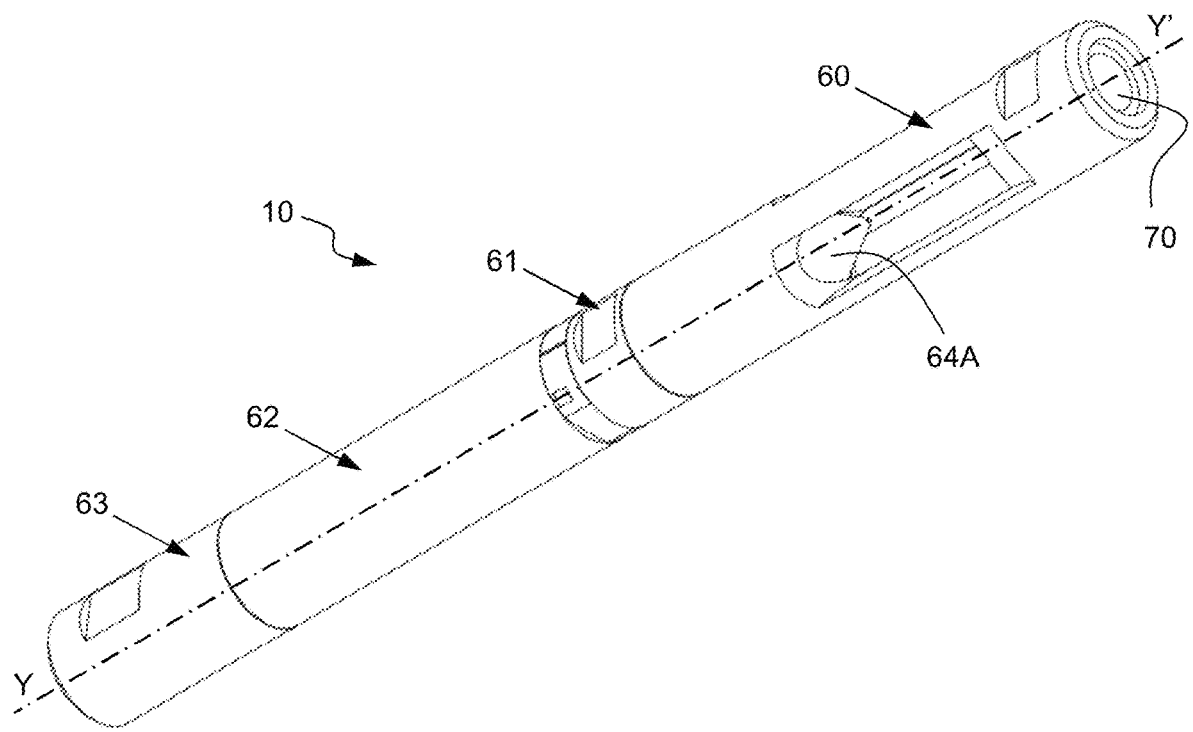

FIGS. 10-13 show a first embodiment of a microwave doppler flowmeter comprising a single microwave doppler sensor 65A positioned axially with respect to the longitudinal axis YY'. The single microwave doppler sensor 65A is received in a recess 76 at an end portion of the microwave module part 61 that connects with the front connection part 60 and covered by the protection cap 64A. In this embodiment, the single microwave doppler sensor 65A is a PCB including the microwave front end module 11 that comprises antennas 16Tx, 16Rx and the microwave circuit 17. FIG. 10 is an A-A cross-sectional view of the first embodiment. FIG. 11 is a partially transparent side view of the first embodiment. FIG. 12 is a B-B cross-sectional view of the first embodiment. FIG. 13 is a perspective view of the first embodiment. The axial microwave doppler sensor 65A comprises anyone of the patch antenna and microwave circuit of the various PCB alternative embodiments 50A, 50B, 50C previously described in relation with FIGS. 7-9.

The front connection part 60 of the first embodiment further comprises longitudinal lateral holes 73 opening towards an open chamber 74 into which protrudes a microwave protection cap 64A of conical shape. The microwave protection cap 64A is further sealed against the second connector 71 by means of sealing 75, for example at least one O-ring, advantageously multiple O-rings.

FIGS. 14-16 show a second embodiment of a microwave doppler flowmeter comprising three radial microwave doppler sensors 65B, 65C and 65D extending parallelly to the longitudinal axis YY'. FIG. 14 is an A-A cross-sectional view of the second embodiment. FIG. 15 is a side view of the second embodiment. FIG. 16 is a B-B cross-sectional view of the second embodiment.

FIGS. 17-19 show a third embodiment of a microwave doppler flowmeter comprising four radial microwave doppler sensors 65B, 65C, 65D and 65E extending parallelly to the longitudinal axis YY'. FIG. 17 is an A-A cross-sectional view of the third embodiment. FIG. 18 is a partially exploded side view of the third embodiment. FIG. 19 is a B-B cross-sectional view of the third embodiment.

Figure 25:
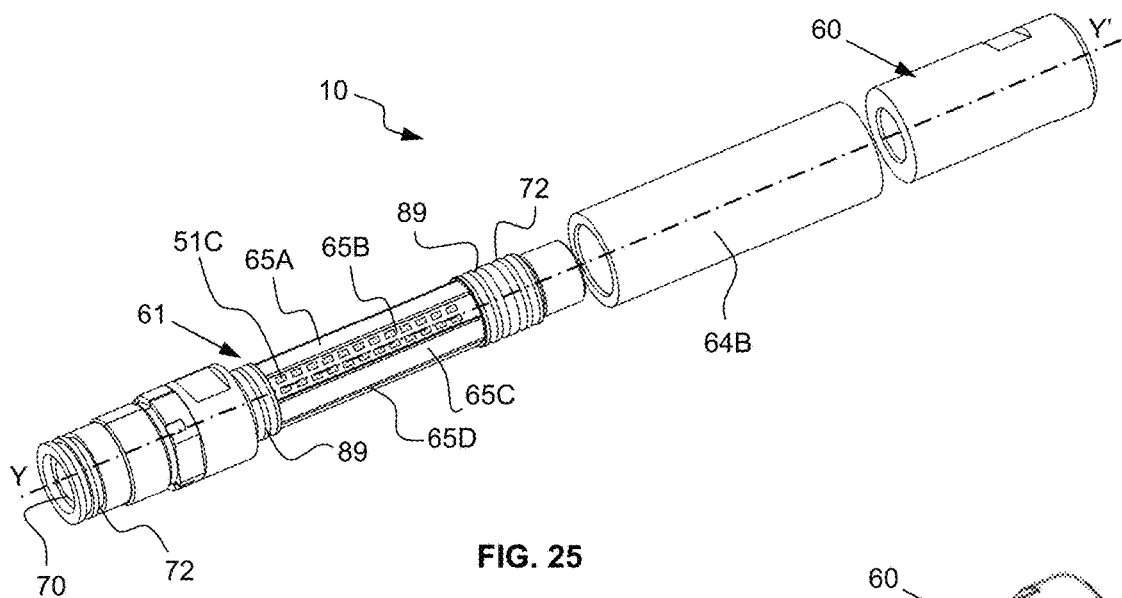

FIGS. 20-22 and 25 show a fourth embodiment of a microwave doppler flowmeter comprising eight radial microwave doppler sensors 65B, 65C, 65D, 65E, 65F, 65G, 65H and 65I extending parallelly to the longitudinal axis YY'. FIG. 20 is an A-A cross-sectional view of the fourth embodiment. FIG. 21 is a side view of the fourth embodiment. FIG. 22 is a B-B cross-section view of the fourth embodiment. FIG. 25 is a partially exploded perspective view of the fourth embodiment.

In these three embodiments, the microwave module part 61 has a front portion 84, a middle portion 85 and rear portion 86. The front portion 84 has a reduced diameter and is received in the first front connector 70 of the front connection part 60. Each radial microwave doppler sensor 65B, 65C and 65D is received in a recess 87 of the middle portion 85 of the microwave module part 61 such that:

the three radial microwave doppler sensors 65B, 65C and 65D form a triangle in the B-B cross-sectional view as depicted in FIG. 16;

the four radial microwave doppler sensors 65B, 65C, 65D and 65E form a square in the B-B cross-sectional view as depicted in FIG. 19; and the eight radial microwave doppler sensors 65B, 65C, 65D, 65E, 65F, 65G, 65H and 65I form an octagon in the B-B cross-sectional view as depicted in FIG. 22.

The protection hollow cylinder 64B is blocked in place between the front connection part 60 and a shoulder 88 defined by the rear portion 86. The middle portion 85 also includes sealings 89 at each end between the middle portion 89 and the protection hollow cylinder 64B, for example at least one O-ring, advantageously multiple O-rings at each end.

In these three embodiments, each radial microwave doppler sensor 65B, 65C, 65D, 65E, 65F, 65G, 65H and 65I is a PCB including the microwave front end module 11 that comprises antennas 16Tx, 16Rx and the microwave circuit 17. Each radial microwave doppler sensor 65B, 65C, 65D, 65E, 65F, 65G, 65H and 65I comprises anyone of the patch antenna and microwave circuit of the various PCB embodiments 50A, 50B, 50C previously described in relation with FIGS. 7-9.

Figures 23, 24:
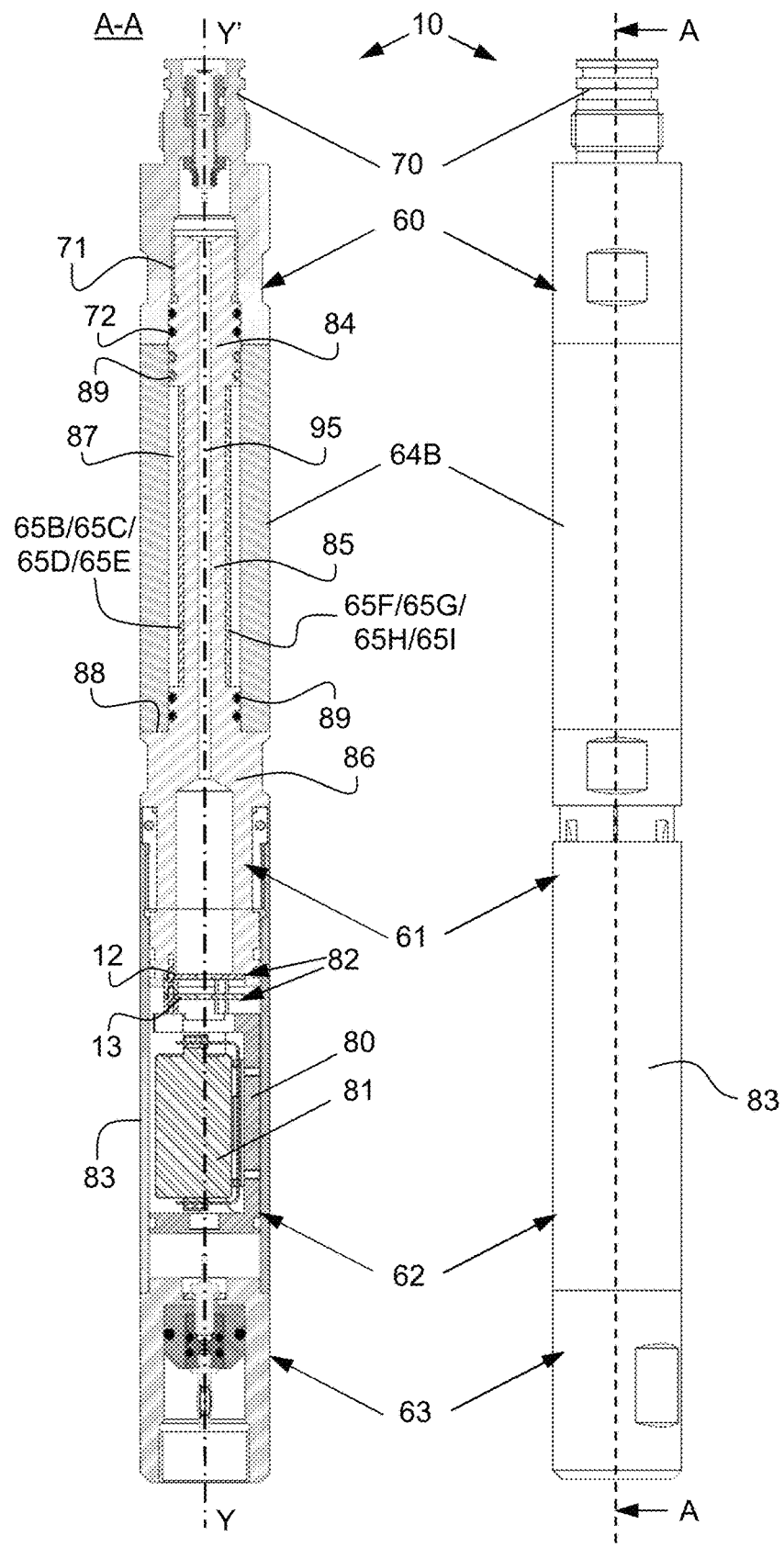
FIGS. 23, 24 and 26 are, respectively, a A-A cross-sectional view, a side view and a perspective view illustrating any one of the microwave modules according to the second, third and fourth embodiments assembled with inferior and superior parts and forming the microwave doppler flowmeter of the invention.
Figure 26:
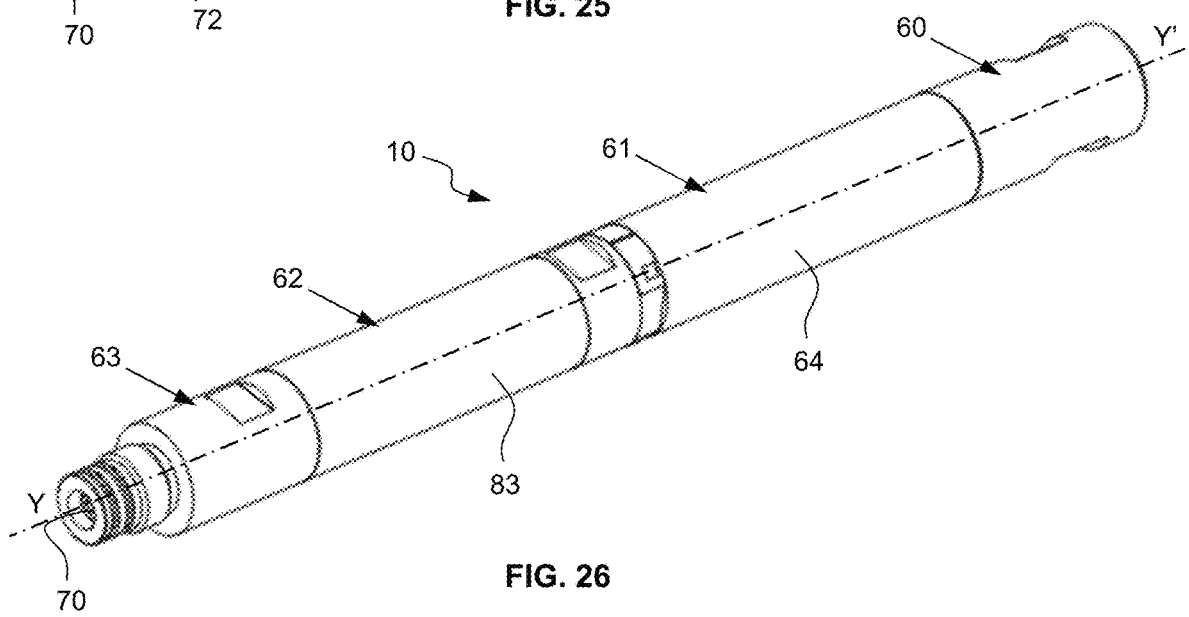
Figure 31:
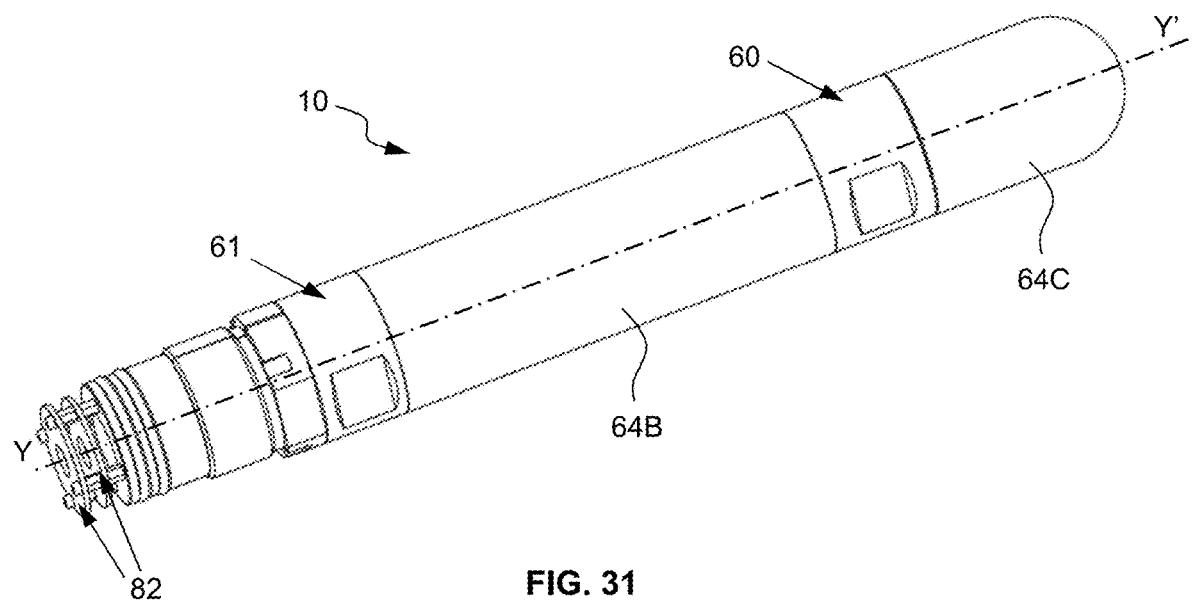
FIGS. 31-34 are, respectively, perspective views illustrating the microwave module, the head of the microwave module, and central part of the microwave module according to different viewing angles of the fifth embodiment.
Figure 32:
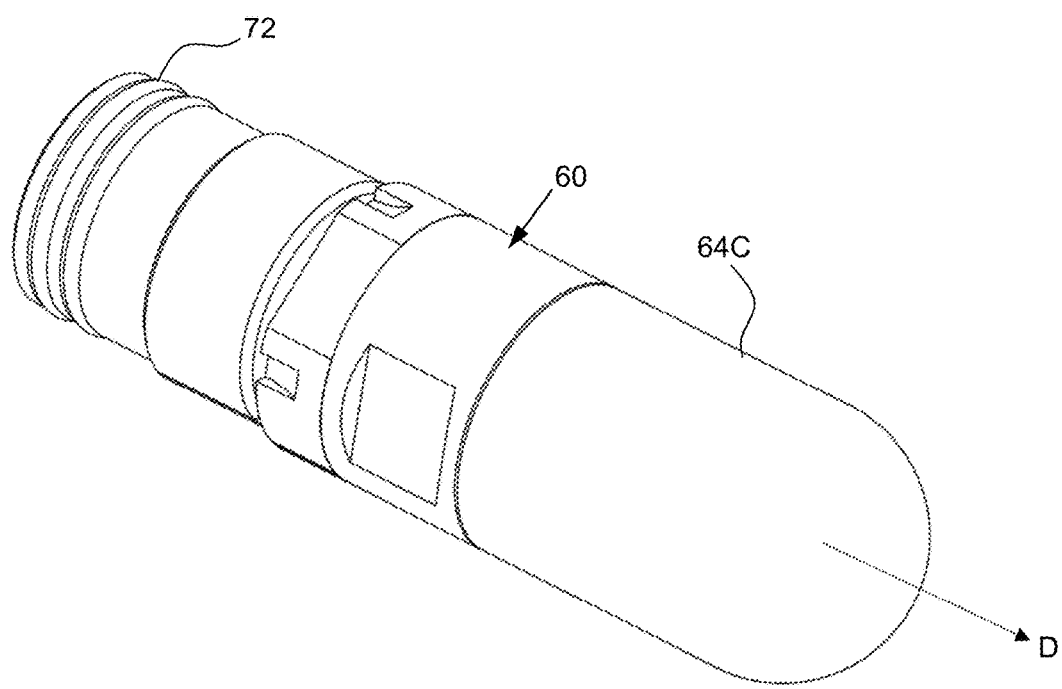
Figure 33:
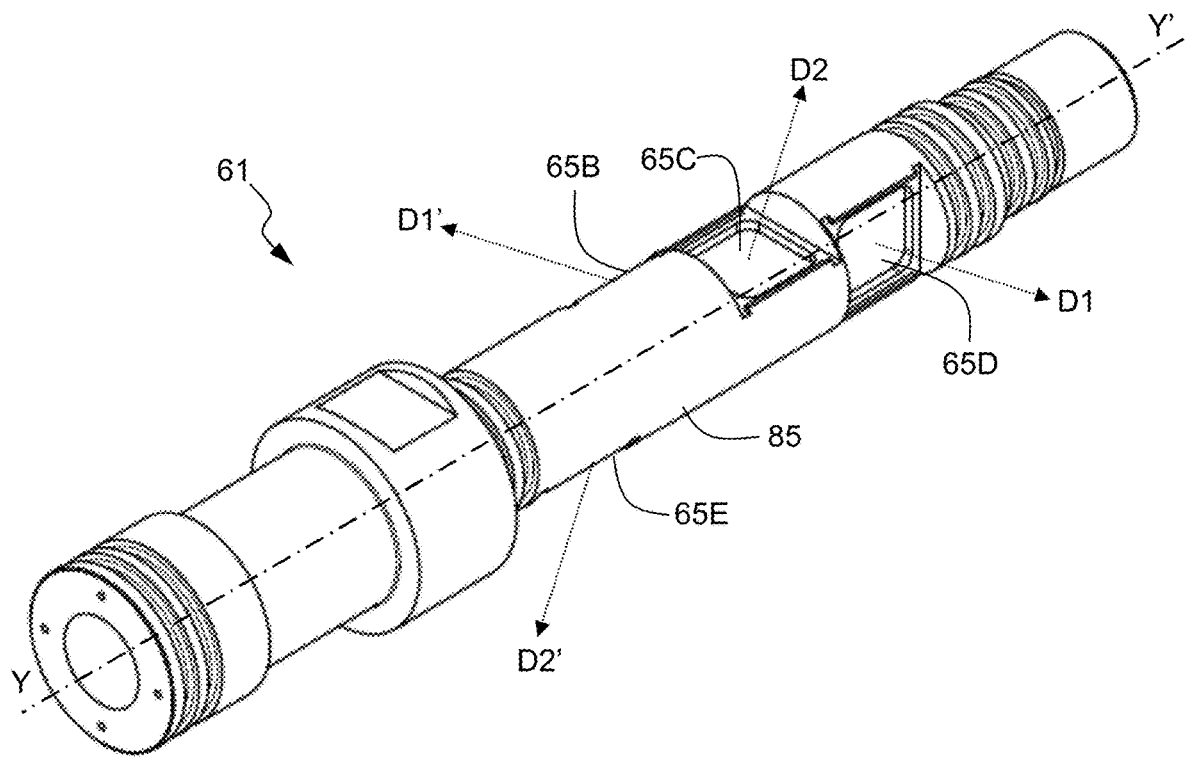
Figure 34:
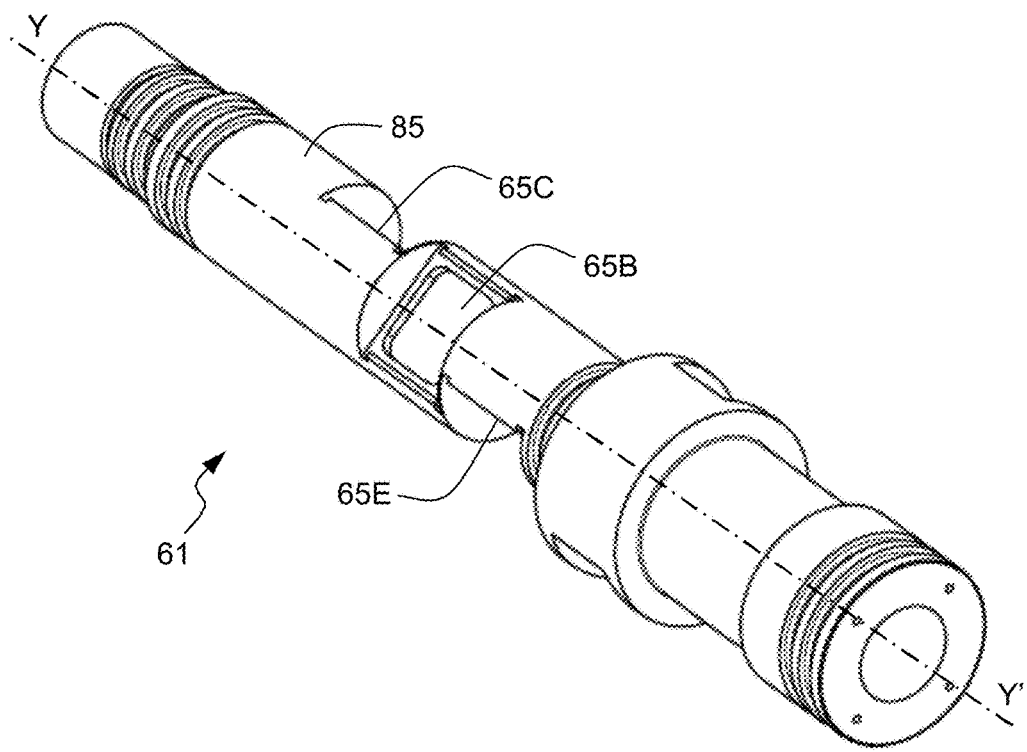

FIGS. 23, 24 and 26 are a, respectively, A-A cross-sectional view, a side view and a perspective view, respectively, illustrating any one of the microwave module part 61 according to the second, third and fourth embodiments assembled with the power and processing module part 62, the front connection part 60 and the rear connection part 63 such as to form the microwave doppler flowmeter 10.

FIGS. 27-34 show a fifth embodiment of a microwave doppler flowmeter incorporating a combination of one axial microwave doppler sensor 65A positioned axially with respect to the longitudinal axis YY', and four radial microwave doppler sensors 65B, 65C, 65D and 65E extending parallelly to the longitudinal axis YY'. FIG. 27 is a C-C cross-sectional view of the fifth embodiment. FIG. 28 is an A-A cross-sectional view of the fifth embodiment. FIG. 29 is a bottom view of the fifth embodiment. FIG. 30 is a B-B cross-sectional view of the fifth embodiment. FIGS. 31-34 are perspective views illustrating the microwave module part 61 (FIG. 31), the head of the microwave module (FIG. 32), and the central part of the microwave module (FIGS. 33 and 34) according to different viewing angles of the fifth embodiment without any protective shell (protection hollow cylinder 64B) for sake of clarity, respectively.

With respect to the axial microwave doppler sensor 65A, the fifth embodiment differs from the first embodiment in that:

the axial microwave doppler sensor 65A is supported by the front connection part 60 (and not by the microwave module part 61 as in the other embodiments), and the front connection part 60 does not include a front connector, instead a front protection cap 64C having a half spherical shape is positioned at the distal end of the front connection part 60.

Thus, this embodiment is intended for being positioned at the end of the production logging tool. The axial microwave doppler sensor 65A is able to cover the forward direction D (see FIG. 32).

The four radial microwave doppler sensors 65B, 65C, 65D and 65E extend parallel-wise to the longitudinal axis YY'. Said sensors are supported in recesses along the middle portion 85 such that they comprise two sets of transmit and receive antennas arranged perpendicularly with respect to each other in order to transmit and receive microwaves in perpendicular directions D1, D1' vs. D2, D2' (see FIG. 33) and towards opposite side of the microwave module part D1, D2 vs D1', D2' (all the directions being perpendicular to the longitudinal axis YY').

Thus, with the fifth embodiment, the microwave doppler flowmeter is able to cover all the directions around in the wellbore because it comprises axially and radially configured microwave doppler sensors 65A, 65B, 65C, 65D and 65E that transmit microwaves forward (i.e. parallel to the longitudinal axis of the wellbore XX') from the single axial sensor 65A towards the wellbore axis (see arrow direction D), and radially outwards (i.e. perpendicular to the longitudinal axis of the wellbore XX') from the radial sensors 65B, 65C, 65D and 65E towards the wall of the wellbore (see arrows directions D1, D1', D2, D2'). By running the microwave doppler flowmeter in the wellbore uphole (towards the surface) or downhole (towards the bottom of the well) along a defined distance, the microwave doppler flowmeter provides measurements of multiple cross-sections of the wellbore all along the wellbore, thus providing a flow profile image.

The drawings and their description hereinbefore illustrate rather than limit the invention. It should be appreciated that embodiments of the present invention are adapted to wells having any deviation with respect to the vertical. In the oilfield industry, in particular during production operations, all the embodiments of the present invention are equally applicable to cased and uncased borehole (open hole), and also other kind of downhole conduits where a fluid may flow. Further, the fluid may be flowing or at rest/static in the conduit. Furthermore, the device includes multiple microwave doppler sensor oriented in different directions. On the one hand, the present invention is not limited to the particular embodiments showing a single, three, four, five or eight microwave doppler sensors as any other number of sensors may be appropriate for specific measurement applications. On the other hand, the present invention is not limited to the particular embodiments showing a sensor extending axially and longitudinally with respect to the longitudinal axis YY' as the sensor may also be inclined with respect to the longitudinal axis YY'. Furthermore, despite the fact that the flowmeter is depicted as positioned at an end of the production logging tool in FIG. 1, it may also be positioned in-between two sub-sections of the production logging tool.

The invention claimed is:

1. A flowmeter of a downhole tool adapted for displacement along and within a hydrocarbon well and intended for use within the hydrocarbon well for measuring a fluid velocity and/or a fluid direction of a moving multiphase fluid present in the hydrocarbon well, including:

a microwave front end module comprising at least one transmit antenna and at least one receive antenna and a microwave circuit, the microwave circuit comprising an oscillator coupled to the transmit antenna for causing said antenna to transmit microwave signals towards the multiphase fluid at a high frequency ranging from 10 to 100 GHz, a mixer coupled to the receive antenna and to a filter for generating an analog in-phase doppler signal depending on microwave signals returned from moving multiphase fluid;

an analog electronics module comprising an amplifier and an analog-to-digital converter converting the analog doppler signal successively into an amplified analog doppler signal and a digital doppler signal;

a digital processing module comprising a Fast Fourier Transform algorithm for processing the digital doppler signal into a Doppler frequency spectrum and a filter providing a compressed Doppler frequency spectrum, said Doppler spectrum containing information indicative of the fluid velocity and/or the fluid direction of the moving multiphase fluid; and a protective shell protecting the microwave front end module, the analog electronics module and the digital processing module from multiphase fluid, the protective shell comprising a first part positioned over said antennas and being transparent to microwave signals, and a second part being opaque to microwave signals.

2. The flowmeter of claim 1, wherein the transmit antenna and receive antenna extend perpendicular to a longitudinal axis of the flowmeter at a front part of the flowmeter so as to form an axial microwave doppler sensor that is sensitive to the multiphase fluid having an axial velocity and flowing along a longitudinal axis of the hydrocarbon well.

3. The flowmeter of claim 2, wherein the flowmeter comprises three or more radially arranged microwave doppler sensors which are polygonally distributed in a plane perpendicular to the longitudinal axis of the flowmeter, respectively.

4. The flowmeter of claim 1, wherein the transmit antenna and receive antenna extend parallel to a longitudinal axis of the flowmeter at a periphery of the flowmeter so as to form a radial microwave doppler sensor that is sensitive to the multiphase fluid having a radial velocity and corresponding to lateral entries into the hydrocarbon well.

5. The flowmeter of claim 1, wherein the transmit antenna and receive antenna are phased array patch antennas.

6. The flowmeter of claim 1, wherein the transmit antenna, the receive antenna and the microwave circuit are integrated on a same printed circuit board PCB, said antennas and said microwave circuit being either on the same side of said PCB or opposite sides of said PCB.

7. The flowmeter of claim 1, further comprising a quadrature mixer and a second filter so as to provide an analog quadrature doppler signal to determine the fluid direction of the moving multiphase fluid.

8. The flowmeter of claim 1, wherein the digital processing module is further coupled to a telemetry module operable to communicate with surface equipment or a memory used to record measurements downhole.

9. The flowmeter of claim 1, wherein the filter providing the compressed Doppler frequency spectrum comprises a logarithmic filter.

10. The flowmeter of claim 1, wherein the first part of protective shell comprises a protection cap having a conical shape, or a protection cap having a half spherical shape, and/or a protection hollow cylinder extending longitudinally.

11. The flowmeter of claim 1, wherein the first part comprises a PolyEther Ether Ketone material, and the second part comprises stainless steel.

12. The flowmeter of claim 1, comprising a microwave module part, a power and processing module part and a rear connection part coupled together in series, having a cylindrical shape and extending longitudinally along the longitudinal axis of the flowmeter, the microwave module part comprising the at least one microwave front end module.

13. The flowmeter of claim 12, wherein the power and processing module part comprises a battery support cradle operable to receive an electrical storage battery, and at least one PCB including the analog electronics module and the digital processing module.

14. The flowmeter of claim 13, wherein the rear connection part comprises a first rear connector used to connect one side of the flowmeter with a sub section of a downhole tool, a second rear connector coupling the rear connection part to the power and processing module part, and an electrical coaxial connector connected to the PCB of the analog electronics and digital processing modules.

15. The flowmeter of claim 12, further comprising a front connection part including a first front connector used to connect one side of the flowmeter with another sub section of a downhole tool, and a second front connector coupling the front connection part to the microwave module part.

16. A downhole tool used to measure and analyze a multiphase fluid present in a hydrocarbon well, the tool being adapted for displacement along and within the hydrocarbon well comprising at least one flowmeter intended for use within a hydrocarbon well for measuring a fluid velocity and/or a fluid direction of a moving multiphase fluid present in the hydrocarbon well, said flowmeter including:
- a microwave front end module comprising at least one transmit antenna and at least one receive antenna and a microwave circuit, the microwave circuit comprising an oscillator coupled to the transmit antenna for causing said antenna to transmit microwave signals towards the multiphase fluid at a high frequency ranging from 10 to 100 GHz, a mixer coupled to the receive antenna and to a filter for generating an analog in-phase doppler signal depending on microwave signals returned from moving multiphase fluid;
- an analog electronics module comprising an amplifier and an analog-to-digital converter converting the analog doppler signal successively into an amplified analog doppler signal and a digital doppler signal;
- a digital processing module comprising a Fast Fourier Transform algorithm for processing the digital doppler signal into a Doppler frequency spectrum and a filter providing a compressed Doppler frequency spectrum, said Doppler spectrum containing information indicative of the fluid velocity and/or the fluid direction of the moving multiphase fluid; and
- a protective shell protecting the microwave front end module, the analog electronics module and the digital processing module from multiphase fluid, the protective shell comprising a first part positioned over said antennas and being transparent to microwave signals, and a second part being opaque to microwave signals.

17. The downhole tool of claim 16, wherein the transmit antenna and receive antenna extend perpendicular to a longitudinal axis of the flowmeter at a front part of the flowmeter so as to form an axial microwave doppler sensor that is sensitive to the multiphase fluid having an axial velocity and flowing along a longitudinal axis of the hydrocarbon well.

18. The downhole tool of claim 17, wherein the flowmeter comprises three or more radially arranged microwave doppler sensors which are polygonally distributed in a plane perpendicular to the longitudinal axis of the flowmeter, respectively.

19. The downhole tool of claim 16, wherein the transmit antenna and receive antenna extend parallel to a longitudinal axis of the flowmeter at a periphery of the flowmeter so as to form a radial microwave doppler sensor that is sensitive to the multiphase fluid having a radial velocity and corresponding to lateral entries into the hydrocarbon well.

20. The downhole tool of claim 16, wherein the transmit antenna and receive antenna are phased array patch antennas.

21. The downhole tool of claim 16, wherein the transmit antenna, the receive antenna and the microwave circuit are integrated on a same printed circuit board PCB, said antennas and said microwave circuit being either on the same side of said PCB or opposite sides of said PCB.

22. The downhole tool of claim 16, further comprising a quadrature mixer and a second filter so as to provide an analog quadrature doppler signal to determine the fluid direction of the moving multiphase fluid.

23. The downhole tool of claim 16, wherein the digital processing module is further coupled to a telemetry module operable to communicate with surface equipment or a memory used to record measurements downhole.

24. The downhole tool of claim 16, wherein the filter providing the compressed Doppler frequency spectrum comprises a logarithmic filter.

25. The downhole tool of claim 16, wherein the first part of protective shell comprises a protection cap having a conical shape, or a protection cap having a half spherical shape, and/or a protection hollow cylinder extending longitudinally.

26. The downhole tool of claim 16, wherein the first part comprises a PolyEther Ether Ketone material, and the second part comprises stainless steel.

27. The downhole tool of claim 16, comprising a microwave module part, a power and processing module part and a rear connection part coupled together in series, having a cylindrical shape and extending longitudinally along the longitudinal axis of the flowmeter, the microwave module part comprising the at least one microwave front end module.

28. The downhole tool of claim 27, wherein the power and processing module part comprises a battery support cradle operable to receive an electrical storage battery, and at least one PCB including the analog electronics module and the digital processing module.

29. The downhole tool of claim 28, wherein the rear connection part comprises a first rear connector used to connect one side of the flowmeter with a sub section of a downhole tool, a second rear connector coupling the rear connection part to the power and processing module part, and an electrical coaxial connector connected to the PCB of the analog electronics and digital processing modules.

30. The downhole tool of claim 27, further comprising a front connection part including a first front connector used to connect one side of the flowmeter with another sub section of a downhole tool, and a second front connector coupling the front connection part to the microwave module part.

31. A method for measuring radial and/or axial flow of a fluid mixture present within a hydrocarbon well according to multiple cross-sections of the hydrocarbon well, the method comprising:
  running a flowmeter along a defined distance within the hydrocarbon well, said flowmeter including:
    a microwave front end module comprising at least one transmit antenna and at least one receive antenna and a microwave circuit, the microwave circuit comprising an oscillator coupled to the transmit antenna for causing said antenna to transmit microwave signals towards the multiphase fluid at a high frequency ranging from 10 to 100 GHz, a mixer coupled to the receive antenna and to a filter for generating an analog in-phase doppler signal depending on microwave signals returned from moving multiphase fluid;
    an analog electronics module comprising an amplifier and an analog-to-digital converter converting the analog doppler signal successively into an amplified analog doppler signal and a digital doppler signal;
    a digital processing module comprising a Fast Fourier Transform algorithm for processing the digital doppler signal into a Doppler frequency spectrum and a filter providing a compressed Doppler frequency spectrum, said Doppler spectrum containing information indicative of the fluid velocity and/or the fluid direction of the moving multiphase fluid;
    a protective shell protecting the microwave front end module, the analog electronics module and the digital processing module from multiphase fluid, the protective shell comprising a first part positioned over said antennas and being transparent to microwave signals, and a second part being opaque to microwave signals;
  transmitting microwave signals towards the multiphase fluid at a high frequency ranging from 10 to 100 GHz,
  receiving microwave signals returned from moving multiphase fluid, and
  processing said returned microwave signals such as to provide a flow profile image of the hydrocarbon well.

32. The measuring method of claim 31, comprising measuring the multiphase fluid having an axial velocity and flowing along a longitudinal axis of the hydrocarbon well by means of the transmit antenna and receive antenna extending perpendicular to a longitudinal axis of the flowmeter at a front part of the flowmeter so as to form an axial microwave doppler sensor.

33. The measuring method of claim 31, comprising measuring the multiphase fluid having a radial velocity and corresponding to lateral entries into the hydrocarbon well by means of the transmit antenna and receive antenna extending parallel to a longitudinal axis of the flowmeter at a periphery of the flowmeter so as to form a radial microwave doppler sensor.

\* \* \* \* \*